3,453,429
SIGNAL DETECTOR

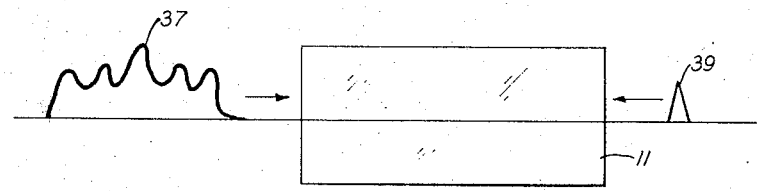
FIG. 4
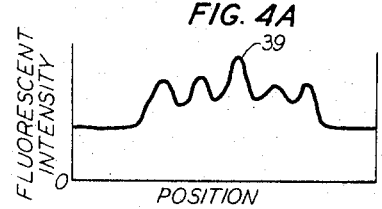
FIG. 4A
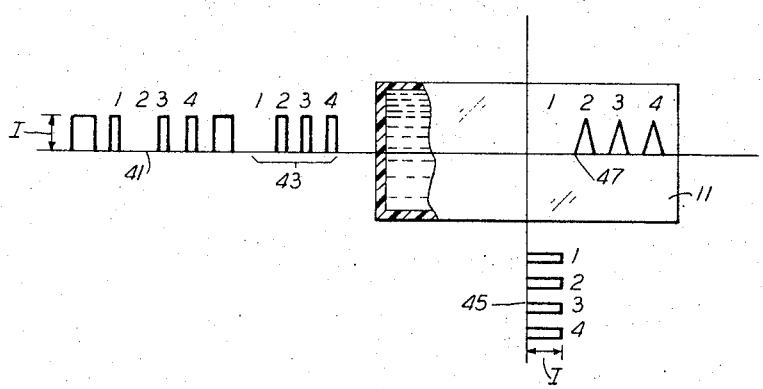
FIG. 5
FIG. 6A          FIG. 6B
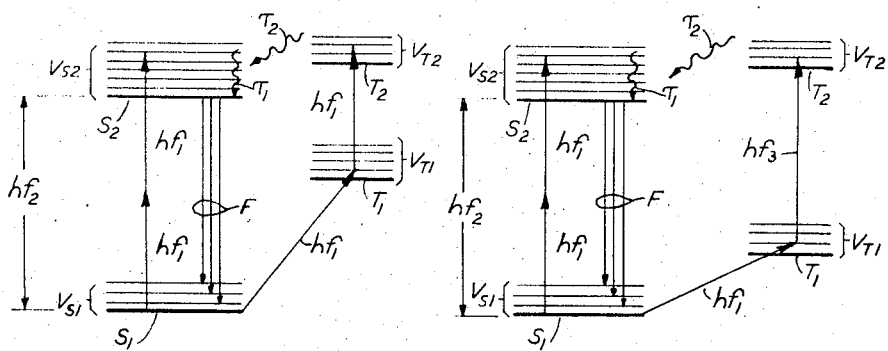

Michel A. Duguay, Berkeley Heights, Joseph A. Giordmaine, Summit, and Peter M. Rentzepis, Millington, N.J., assignors to Bell Telephone Laboratories, Incorporated, Murray Hill and Berkeley Heights, N.J., a corporation of New York
Filed July 21, 1967, Ser. No. 655,224
Int. Cl. G02f 3/00
U.S. Cl. 250—71                              20 Claims

ABSTRACT OF THE DISCLOSURE

A signal detector and/or display system includes a medium which requires the absorption of two photons to fluoresce and is characterized by a fluorescent intensity proportional to approximately the square of the sum of the intensities of coincident signals transmitted through the medium. A pulse of picosecond width is detected and the pulse width measured by causing the pulse to overlap itself within the medium. A complex signal is displayed by sampling the signal with a picosecond pulse within the medium.

Background of the invention

This invention relates to signal detectors and more particularly to picosecond pulse detectors and display devices utilizing two-photon fluorescent materials.

Recent developments in the laser art have made it possible to phase-lock the oscillating modes of a laser by any of several well-known techniques including synchronous modulation and Q-switching. The output of a phase-locked laser is a pulse train having a pulse repetition rate given by $c/2L$, where $c$ is the velocity of light and $L$ is length of the active medium. More importantly, however, the pulse width of the pulses generated is typically in the picosecond range. Such pulses, which are also produced by stimulated Raman emission, are ideally suited to serve as the carrier for an optical pulse code modulation system.

To utilize such narrow pulses in an optical communication system, it is necessary to be able to detect the pulses at a receiver. The enormous bandwidth required to detect such narrow pulses is not available in prior art receivers however.

In addition, in many cases it is desirable to measure the pulse width and pulse repetition rate of such a pulse train. The prior art has resorted to certain indirect methods of measurement including coincidence techniques which utilize electrooptic crystals that generate as an output the sum and difference frequencies of two coincident signal inputs. To detect a pulse from a phase-locked laser, for example, the pulse is split into two signals and passed simultaneously through the crystal. The output of the crystal is detected. By inserting a variable time-delay into the path of one of the signals, the output can be reduced to zero. The amount of delay inserted is then an indirect measure of the pulse width. However, the measurements cannot be accurately made from a single pulse, rather many pulses are required to properly adjust the delay and reduce the output to zero.

Summary of the invention

In accordance with an illustrative embodiment of the invention a pulse detector comprises a medium, typically 1,2,5,6-dibenzanthracene (DBA) dissolved in benzene, which requires the absorption of two photons to fluoresce and is characterized by a fluorescent intensity proportional to approximately the square of the sum of the intensities of signals transmitted through the medium. Fluorescence is produced in DBA by the absorption of two photons from a single signal or one photon from each of two coincident signals. Other materials such as pentacene, however, require the coincidence of two signals within the medium to produce fluorescence and do not fluoresce from a single signal. Thus, when only a single pulse of intensity $I$ is directed into the medium such as DBA, the fluorescence produced has intensity of approximately $\alpha I^2 \Delta t$, where $\alpha$ is a constant and $\Delta t$ is the pulse width, typically in the picosecond range. But when a second pulse (also of intensity $I$ and width $\Delta t$) is transmitted through the medium, the intensity of fluorescence in the areas where the pulses are coincident and overlap is approximately proportional to $\alpha(I+I)^2\Delta t$ or $4\alpha I^2 \Delta t$, and where they are noncoincident and overlap the fluorescent intensity is $2\alpha I^2 \Delta t$. The contrast ratio is therefore 2:1. In the ideal case, however, theoretical analysis shows that for purely sinusoidal pulses the contrast ratio may be as high as 3:1. In addition, the length of the fluorescent area is proportional to the duration $\Delta t$ of the pulse. The intensity pattern can be photographed by a camera and graphically displayed by well-known instruments such as a densitometer.

The invention operates as a pulse decoder in an optical pulse code modulation system as follows. The modulated carrier, typically a train of picosecond information pulses generated by a phase-locked laser, is directed into the medium. A picosecond interrogate pulse is also directed into the medium at appropriate times in order to be coincident with and to overlap a particular information pulse. When an information pulse is present, the medium fluoresces with intensity of approximately $4\alpha I^2 \Delta t$, as described above. When, however, no information pulse is present, the fluorescent intensity is only $\alpha I^2 \Delta t$. The contrast is readily detected in order to indicate the presence or absence of an information pulse (i.e., logical 1 or 0).

A display device, which could be termed an optical oscilloscope, is readily adaptable to the use of two-photon fluorescent mediums. A complex signal is displayed by directing it through the medium in one direction and directing simultaneously a picosecond sampling pulse through the medium in the opposite direction. The instantaneous fluorescent intensity of the medium is proportional to the instantaneous amplitude of the complex signal with picosecond resolution, and the length of the fluorescent area is proportional to the duration of the complex signal.

In a similar way, picosecond pulses can be displayed. For instance, a pulse to be detected is split into two signals which, again, are directed simultaneously through the medium in opposite directions. Where the pulses overlap, the medium fluoresces and the length of the fluorescent area is a direct measure of the picosecond pulse width.

Brief description of the drawings

The above features of the invention, together with its various advantages, can be easily understood from the following more detailed discussion taken in conjunction with the accompanying drawings, in which:

FIG. 4 shows schematically an optical oscilloscope in accordance with one embodiment of the invention;

FIG. 4A is a graph of fluorescent intensity produced by the invention as shown in FIG. 4;

FIG. 5 shows schematically a pulse decoder in accordance with one embodiment of the invention;

FIG. 6A shows the energy levels of one type of two-photon fluorescent material; and FIG. 6B shows the energy levels of another type of two-photon fluorescent material.

Detailed description

Figure 1:
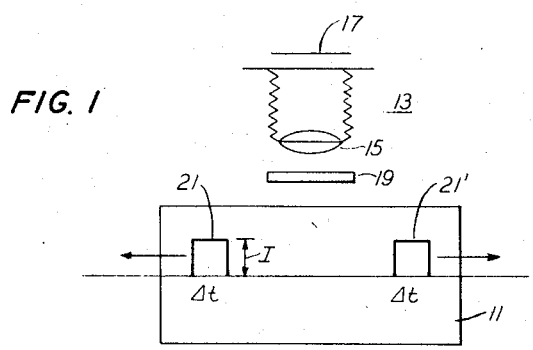
FIG. 1 shows schematically one embodiment of the invention for measuring pulse width.

Turning now to FIG. 1 there is shown schematically a display device for measuring pulse width and intensity comprising a medium 11 which requires the absorption of two photons in order to fluoresce. The medium 11 is typically an aromatic or substituted aromatic hydrocarbon such as anthracene, 1,2-benzanthracene, 1,2,5,6-dibenzanthracene or biphenyl dissolved in a suitable solvent such as benzene. Alternatively the medium could be in a gaseous state (e.g., a vaporized aromatic hydrocarbon) or in a solid state (e.g., an aromatic hydrocarbon dispersed in a plastic). A camera system 13 focuses the fluorescent image through a lens 15 onto a photographic plate 17. A filter 19, interposed between the medium 11 and the lens 15, transmits fluorescent light but is opaque to optical signal light.

Figure 1A:
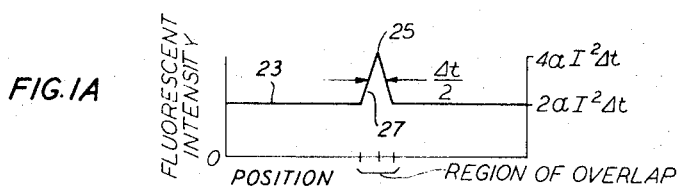
FIG. 1A is a graph of the fluorescent intensity produced by the invention as shown in FIG. 1.

A pulse, of unknown width $\Delta t$ and intensity I, to be displayed is split into two pulses 21 and 21' which are directed in opposite directions through the medium 11. The pulses cause the medium to fluoresce and the image produced is recorded on the photographic plate 17. A graph of fluorescent intensity versus position within the medium is shown in FIG. 1A. A single pulse produces a fluorescent intensity of approximately $\alpha I^2 \Delta t$ as a result of the absorption by the medium 11 of two photons from that pulse. Where two identical pulses traverse the same portion of the medium 11, but at different times, the total fluorescent intensity, indicated by the line 23, is $2\alpha I^2 \Delta t$, the sum of the intensities produced by each pulse. Where however, the pulses overlap within the medium, the maximum fluorescent intensity is approximately $\alpha(I+I)^2 \Delta t$ or $4\alpha I^2 \Delta t$, as indicated by the peak 25 of the image pulse 27. In this latter case, two-photon fluorescence results from the absorption by the medium in the region of overlap of one photon from each of the pulses. The length of image pulse 27 at three-quarters of the maximum intensity is $\Delta t/2$. Thus, the unknown parameters of a pulse can be completely determined by the aforementioned technique.

Figure 2:
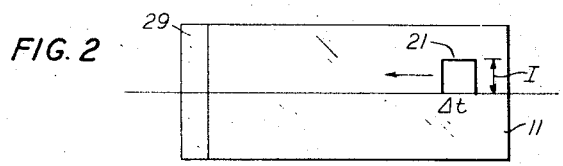
FIG. 2 shows schematically another embodiment of the invention for measuring pulse width.
Figure 2A:
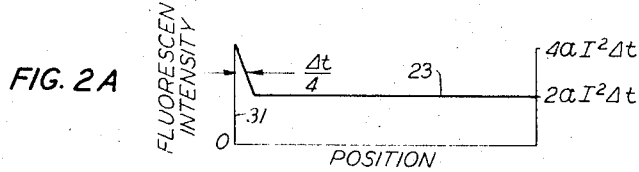
FIG. 2A is a graph of fluorescent intensity produced by the invention as shown in FIG. 2.

The parameters of a pulse can be determined without splitting the pulse into two signals, as shown in FIG. 2. A mirror 29 is placed at one end of the medium 11 and the pulse 21 to be detected enters the other end. The pulse 21 strikes the mirror 29 normally and is reflected upon itself for a period $\Delta t/2$ in a region of the medium adjacent the mirror. The effect is the same as if two pulses overlapped within the medium. The maximum fluorescent intensity occurs at the mirror and is equal to $4\alpha I^2 \Delta t$. The image pulse 31 produced has a width of $\Delta t/4$ measured from the mirror surface to the point of three-quarters of maximum fluorescent intensity as shown in FIG. 2A.

Figure 3:
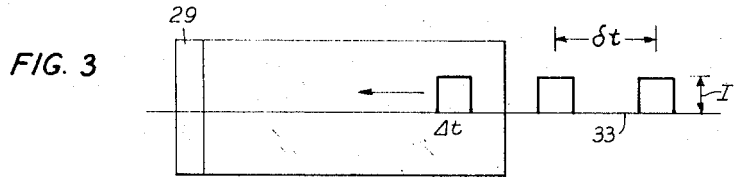
FIG. 3 shows schematically an embodiment of the invention for measuring both the pulse width and pulse repetition rate of a pulse train.
Figure 3A:
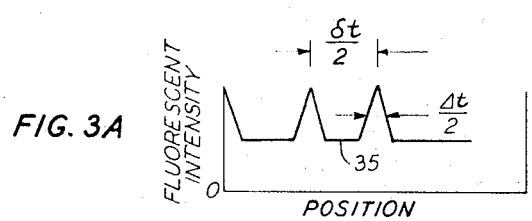
FIG. 3A is a graph of fluorescent intensity produced by the invention as shown in FIG. 3.

In the same way, as shown in FIG. 3, the pulse spacing $\delta t$ and pulse width $\Delta t$ of a pulse train 33 can be measured by utilizing a mirror 29 disposed at one end of a two-photon fluorescent medium. The image pulses 35, as depicted in the graph of FIG. 3A, are characterized by a pulse spacing of $\delta t/2$ and a pulse width at three-quarters of maximum intensity of $\Delta t/2$. Thus, measurement of the characteristics of the image pulses 35 is a direct measure of the parameters of the pulse train 33.

In a specific example, two-photon fluorescence has been observed in a 0.01 M saturated solution of 1,2,5,6-dibenzanthracene (DBA) in benzene. The fluorescence has allowed the direct display and photographing of light pulses as short as 2 picoseconds. Typically, 5,300 A. light is generated in a KDP crystal by a $1.06\mu$ $Nd^{+3}$ glass laser, mode-locked by the well-known Q-switched dye technique. The output of the crystal consists typically of about a twenty-pulse train having pulse spacing of $4.6 \times 10^3$ picoseconds and pulse width of 2 picoseconds. After the laser fundamental and pump light have been filtered out, and the beam has been telescoped to diameter of 1 mm., the beam is made to traverse a cell 2 cm. in length containing DBA. The beam produces a bright, uniform, blue track in the DBA solution with a diameter of 0.7 mm. The two-photon fluorescent emission is primarily in the 4,000–4,200 A. range with a lifetime of less than 50 nanoseconds. A direct display of the pulse trains is obtained, as described with respect to FIG. 3, by normal reflection of the beam at a mirror immersed in the DBA solution at one end of the cell.

In general, two-photon fluorescence is characteristic of aromatic and substituted aromatic hydrocarbons. Typical examples, besides DBA, include benzene solution of biphenyl, naphthalene, 1,2-benzanthracene, anthracene, 9,10-diphenylanthracene, 9,10-dimethylanthracene and other substituted anthracenes. Nonaromatic materials (e.g., potassium vapor and calcium fluoride crystals doped with $Eu^{+3}$ or $Mo^{+5}$) also produced two-photon fluorescence, however.

Other solvents, such as ethyl alcohol, can also be utilized as long as they are transparent to the radiation transmitted through the medium, do not disassociate in the presence of that radiation, and do not quench the fluorescence.

In another embodiment of the invention, as shown in FIG. 4, a two-photon fluorescent medium 11 is utilized as part of an optical oscilloscope. A complex signal 37 to be displayed is directed into the medium 11 and a picosecond sampling pulse 39 is directed into the medium from the opposite direction. Where the complex signal and the pulse overlap, the medium 11 fluoresces with an intensity proportional to approximately the square of the sum of the intensities of the complex signal and the pulse. The fluorescent intensity pattern is photographed and the graph shown in FIG. 4 is plotted by a densitometer. The curve 39 is a reproduction of the complex signal 37. The optical oscilloscope is particularly useful where the complex signal has duration of only 100 or 1,000 picoseconds and is therefore not reproducible by prior art techniques. The resolution provided in the present embodiment is typically a picosecond, the width of the sampling pulse. For proper reproduction the intensities of the complex signal and the sampling pulse are preferably made to be equal.

The present invention serves as an optical decoder for a pulse code modulation system as shown in FIG. 5. A train of information pulses 41 to be decoded is directed into the medium 11. In particular, consider the frame, designated by the bracket 43, which consists of four channels each having an information pulse present except the first. A group of four sampling pulses 45 is also directed into the medium 11 along a path to intercept the information pulses. The sampling pulses are timed so that each sampling pulse overlaps and in coincidence with a corresponding information pulse. The coincidence of an information pulse and a sampling pulse produces a fluorescent intensity of approximately $4\alpha I^2 \Delta t$, whereas the absence of an information pulse results in a fluorescent intensity of only $\alpha I^2 \Delta t$ produced by the sampling pulse alone. Thus, the presence or absence of an information pulse (i.e., logical 1 or 0) is indicated by the fluorescent intensity recorded, as shown at 47 for example.

Theory

The following discussion is for the purpose of explanation only and is not to be construed as a limitation upon the scope of the invention.

The physical mechanism which produces two-photon fluorescence is easily understood with reference to FIG. 6A which shows the electron energy levels for a typical two-photon fluorescent medium. The medium is characterized by a pair of singlet states $S_1$ and $S_2$ separated by an energy gap corresponding to $hf_2$ ($h$ being Planck's constant). Associated with each singlet state $S_1$ and $S_2$ are vibrational states $V_{S1}$ and $V_{S2}$, respectively. The dominant mechanism which produces fluorescence requires, for a signal of frequency $f_1$, that two photons be absorbed by the medium in order to excite electrons from $S_1$ to states $S_2$ or $V_{S2}$, termed the two-photon levels. The electrons in the higher state $V_{S2}$ fall to $S_2$, undergoing a nonradiative transition $\tau_1$, and then fall to $S_1$ producing fluorescence F at frequency $f_2$. (Alternatively, the electrons could fall to $V_{S1}$ producing fluorescence at a frequency lower than $f_2$.) The fluorescent intensity is given by approximately $\alpha I^2 \Delta t$, as described previously.

To obtain two-photon fluorescence, it is implicit, of course, that the absorption of a single photon be insufficient to excite electrons from $S_1$ to $S_2$; thus, one condition to be satisfied in that $hf_2 > hf_1$. Where two signals are transmitted through the medium, however, two-photon fluorescence can be produced in three ways: (1) two photons can be absorbed from the first signal in which case the fluorescent intensity is $\alpha I^2 \Delta t$, (2) two photons can be absorbed from the second signal in which case the fluorescent intensity is again $\alpha I^2 \Delta t$, or (3) one photon can be absorbed from each of the two coincident signals in which case the fluorescent intensity is approximately $4\alpha I^2 \Delta t$. An additional condition to be satisfied, therefore, is that $hf_2 \leqslant 2hf_1$ in order that two photons each of energy $hf_1$ excite electrons from $S_1$ to $S_2$. An example is 1,2,5,6-dibenzanthracene for which $\lambda_1 = c/f_1 = 5,300$ A. and the fluorescence wavelength $\lambda_2 = c/f_2 = 4,000$ A. to 4,200 A. Others include 1,2-benzanthracene for which the fluorescence wavelength $\lambda_2 = 3,800$ A. to 4,200 A. and biphenyl for which $\lambda_2 = 3,000$ A. to 3,500 A.

It follows, therefore, that if the two signals transmitted through the medium are of different frequencies $f_1$ and $f_3$, then the conditions to be satisfied are $hf_2 > hf_1$, $hf_2 > hf_3$, and $hf_2 \leq hf_1 + hf_3$.

Even with the above frequency restrictions, the pulse detector described herein is an extremely wide band device. The broad bandwidth arises from the fact that to produce fluorescence electrons must be excited from $S_1$ to $S_2$ or to any of the vibrational $V_{S2}$. But, these latter states encompass a wide spectrum, typically 2,000 wave numbers (i.e., $6 \times 10^{13}$ c.p.s.), which gives rise to the large bandwidth. In the optical oscilloscope embodiment of FIG. 4, large bandwidths are advantageous inasmuch as the complex signal 37 frequently contains a broad spectrum of frequency components. To reproduce such a signal faithfully, the medium 11 should respond (fluoresce) at substantially all of the frequency components contained in the signal.

An alternative, and less dominant, mechanism that may produce two-photon fluorescence involves the excitation of electrons (by a single photon at $f_1$) from $S_1$ to a triplet state $T_1$ or to its associated vibrational states $V_{T1}$. $T_1$ and $V_{T1}$ are termed the one-photon levels. A second photon at $f_1$ (e.g., produced by normal reflection of the signal on itself) excites electrons from $T_1$ (or $V_{T1}$) to a second triplet state $T_2$ or its associated vibrational states $V_{T2}$. $T_2$ and $V_{T2}$ are also termed two-photon levels. Because the vibrational levels $V_{T2}$ have energies nearly equal to the vibrational levels $V_{S2}$, a resonance condition is established whereby electrons in a $V_{T2}$ state undergo a nonradiative transition $\tau_2$ to a $V_{S2}$ vibrational state. From $V_{S2}$ the electrons undergo a second nonradiative transition to $S_2$ and then fall to $S_1$ producing two-photo fluorescence F.

Materials which have a more dominant triplet mechanism (e.g., pentacene), as described above, are useful in eliminating the background trace (i.e., line 23 of FIG. 1A) produced by the absorption of two photons from either of two single pulses at frequency $f_1$ and $f_3$. In particular, the material is characterized by an electron energy level diagram as shown schematically in FIG. 6B. The dominant two-photon fluorescent mechanism involves the excitation of an electron from $S_1$ to $V_{T1}$ to $V_{T2}$ from which occurs a nonradiative transition $\tau_2$ to $V_{S2}$, another nonradiative transition $\tau_1$ to $S_2$, and finally a transition from $S_2$ to $S_1$ (or $V_{S1}$) accompanied by fluorescence F. First, the material is chosen such that $T_1$ has energy corresponding to $hf_1$ and is typically a low energy state close to $S_1$ such that $hf_1 \ll hf_3$. This latter condition prevents the absorption of two photons from the pulse at $f_3$ alone simply because the energy $hf_3$ does not correspond to the energy of state $T_1$ (or $V_{T1}$). Second, the material is chosen such that the energy gap between $T_1$ and $T_2$ corresponds to $hf_3$ but is much larger than $hf_1$. This condition prevents the absorption of a second photon from the pulse at $f_1$ even though that pulse may have absorbed one photon and excited electrons from $S_1$ to $T_1$. The net effect is that neither pulse alone can produce fluorescence, thereby eliminating the background trace. It is to be noted that the absorption of two photons from the pulse at $f_3$ does not excite electrons from $S_1$ to $S_2$ because the pulse has insufficient power to do so. Pentacene is a typical material for which $\lambda_1 = c/f_1 = 12,500$ A. and $\lambda_3 = c/f_3 = 4,900$ A.

In order to assure that the background trace is eliminated, it is preferable that the lifetimes of $V_{T1}$ vibrational states be of the order of picoseconds. Otherwise, electrons excited to $V_{T1}$ by a signal at $f_1$ could remain there long enough that a subsequent, noncoincident signal at $f_2$ could excite the electrons to $V_{T2}$ and thereby produce a fluorescent background trace.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, pulse detectors and display devices in accordance with the invention can be devised using materials which require the absorption of a plurality of photons (e.g., three) to produce fluorescence, in which case the fluorescent intensity would be exponentially proportional (e.g., cubic) to the sum of the intensities of the signals transmitted through the medium. Typical three-photon fluorescent materials include naphthalene in crystal form or ordinary water.

What is claimed is:
1. Optical apparatus comprising:
   a medium having an energy gap defined by a lower and a higher energy state, the separation of the energy states being such as to require the absorption of at least two photons to excite electrons from the lower to the higher energy states, the gap being characterized by a radiative transition from the higher to lower energy states,
   means for introducing a first signal into said medium to cause said medium to absorb at least one photon, and
   means for producing within a region of said medium an optical representation of said first signal comprising means for producing within said region at least one additional photon for simultaneous absorption with the photon supplied by said first signal to excite electrons from the lower to the higher energy state.
2. The optical apparatus of claim 1 wherein said additional photon producing means comprises means for causing a second signal to intercept the first signal within said region of said medium.
3. The optical apparatus of claim 2 wherein the first signal is a complex signal and the second signal is a sampling pulse.
4. The optical apparatus of claim 1 wherein the first signal is directed into one end of said medium and said additional photon producing means comprises a reflector disposed at the other end of said medium normal to the path of the first signal.

5. A signal detector comprising:
a medium having an energy gap such that the absorption of at least two photons is required to produce fluorescence,
means for directing a first signal into said medium to cause said medium to absorb at least one photon, and
means for causing said medium to fluoresce with an intensity proportional to the amplitude of the first signal and over a region proportional to the duration of the first signal comprising means for causing a second signal to intercept the first signal within said medium and to cause said medium to absorb at least one additional photon and to fluoresce at the region of interception with an intensity exponentially proportional to the sum of the intensities of the first and second signals.

6. A signal detector comprising:
a medium having an energy gap such that the absorption of two photons is required to produce fluorescence,
means for directing a first signal into said medium to cause said medium to absorb a first photon, and
means for causing said medium to fluoresce with an intensity proportional to the amplitude of the first signal and over a region of the medium proportional to the duration of the first signal comprising means for causing a second signal to intercept the first signal within said medium and to cause said medium to absorb a second photon and to fluoresce at the region of interception with an intensity proportional to the square of the sum of the intensities of the first and second signals.

7. The signal detector of claim 6 wherein said medium is characterized by a first singlet energy state at a ground level and a second singlet energy state at the two-photon energy level.

8. The signal detector of claim 7 wherein the first signal and second signals are characterized by first and second energies, respectively, such that the difference in energy between said singlet states is greater than either of the signal energies but less than the sum of the signal energies.

9. The signal detector of claim 7 wherein said medium is further characterized by a first triplet energy state at the one-photon energy level and second triplet energy state at the two-photon energy level.

10. The signal detector of claim 9 wherein the first and second signals are characterized by first and second energies, respectively, such that the difference in energy between said first singlet and said first triplet states is substantially equal to but not greater than the energy of the first signal, and the difference in energy between said first triplet state and said second triplet state is substantially equal to but not greater than the energy of the second signal.

11. The signal detector of claim 10 wherein the difference in energy between said first and second triplet states is substantially greater than the difference in energy between said first triplet state and said first singlet state.

12. The signal detector of claim 1 wherein said medium comprises an aromatic hydrocarbon.

13. The signal detector of claim 12 wherein said aromatic hydrocarbon comprises anthracene.

14. The signal detector of claim 12 wherein said aromatic hydrocarbon comprises biphenyl.

15. The signal detector of claim 12 wherein said aromatic hydrocarbon comprises naphthalene.

16. The signal detector of claim 1 wherein said medium comprises a substituted aromatic hydrocarbon.

17. The signal detector of claim 16 wherein said substituted aromatic hydrocarbon comprises 1,2,5,6-dibenzanthracene.

18. The signal detector of claim 16 wherein said substituted aromatic hydrocarbon comprises 1,2-benzanthracene.

19. The signal detector of claim 16 wherein said substituted aromatic hydrocarbon comprises 9,10-diphenylanthracene.

20. The signal detector of claim 16 wherein said substituted aromatic hydrocarbon comprises 9,10-dimethylanthracene.

References Cited
UNITED STATES PATENTS 3,070,698  12/1962  Bloembergen.

RALPH G. NILSON, *Primary Examiner.*

M. J. FROME, *Assistant Examiner.*

U.S. Cl. X.R.

250—833; 331—945